Figure 1:
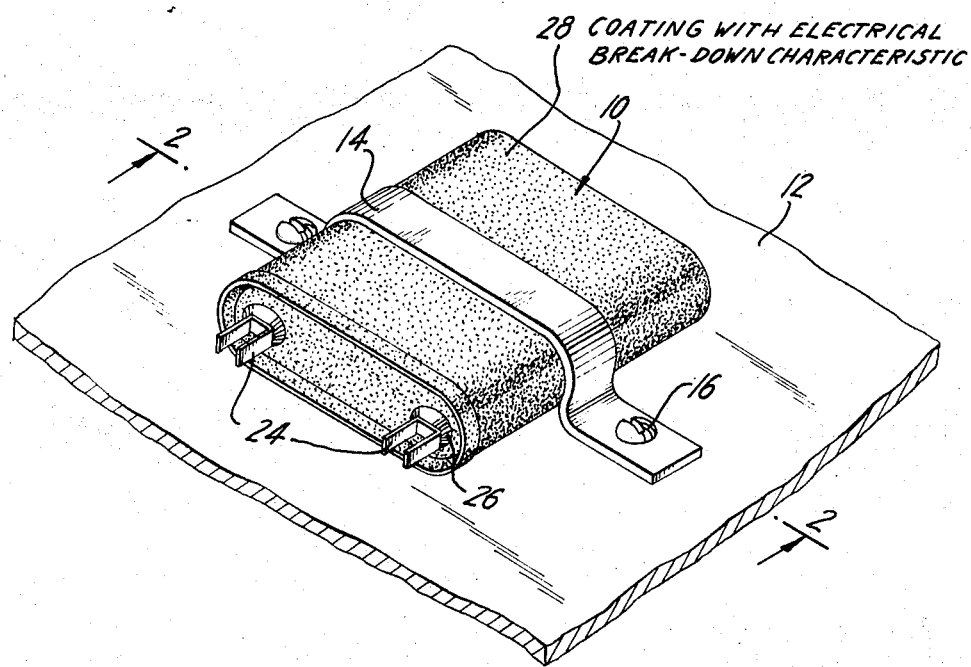

United States Patent [19]
Leister et al.

[11] 3,810,252
[45] May 7, 1974

[54] GROUND BONDED APPARATUS

[75] Inventors: Edwin S. Leister, Maplewood; George F. Kovach, Union, both of N.J.; William M. Robinson, New Bedford, Mass.

[73] Assignees: Duralac Chemical Corporation, by said Leister and Kovach; Cornell-Dubilier Electric Corporation, both of Newark, N.J.; by said Robinson

[22] Filed: Apr. 23, 1973

[21] Appl. No.: 353,632

[52] U.S. Cl. .................. 317/12 R, 174/51, 317/247
[51] Int. Cl. ............................................. H02h 7/16
[58] Field of Search ................ 317/12 R, 247, 260; 174/51

[56] References Cited
UNITED STATES PATENTS
3,522,498   8/1970   Price .............................. 317/260 X
3,627,900   12/1971  Robinson ............................ 174/51

Primary Examiner—Bernard A. Gilheany
Assistant Examiner—David A. Tone

[57] ABSTRACT

An electrical device includes a metal container enclosing an electrical component, especially a capacitor having a metal container enclosing a capacitor winding separated by electrical insulation from the metal container. A bracket clamps the device to a grounded metal support, the bracket and the support constituting grounding and mounting means. A corrosion-resistant coating covers the metal container. This coating has low electrical resistance (compared to usual paint) and it has a break-down characteristic causing a short-circuit to be formed between the metal container and the grounding and mounting structure in case an electrical fault should develop in the electrical insulation separating the container from the electrical component in the container. The short-circuit prevents the rise of container-to-ground voltage to a dangerous level despite possibly high ground-fault currents, e.g., 120 amperes. Preferred coatings use heat-degradable resins to impart corrosion resistance. With such coatings break-down occurs when the container voltage rises no more than 10 volts above ground.

8 Claims, 2 Drawing Figures

28 COATING WITH ELECTRICAL BREAK-DOWN CHARACTERISTIC

GROUND BONDED APPARATUS

The present invention relates to electrical apparatus, especially capacitors, requiring an electrical ground.

BACKGROUND OF THE INVENTION

The invention is discussed for simplicity in terms of electrical capacitors to which the invention is especially applicable, although it will be apparent that the invention has broader application. A capacitor used in an air conditioner, for example a "motor-run" capacitor, commonly includes a wound capacitor section in a metal container. The capacitor section has a pair of electrodes provided with terminals extending through insulating bushings in a wall of the container, and the wound capacitor section itself is separated from the metal container by insulation. Commonly the wound section is impregnated and the container void spaces are filled with a suitable impregnant. The capacitor is mounted on a metal chassis by a separate bracket. The metal container itself is covered by a protective paint before being mounted and consequently the metal container is insulated by the protective paint from both the metal bracket and the chassis on which the capacitor is mounted. However, it is important for the container to be electrically connected to ground, a requirement of Underwriters Laboratories. This is because there is a danger of an electrical fault or insulation break-down developing between the electrical container and the capacitor winding withing the container, a condition which could raise the electrical potential of the container to a dangerous value.

Various grounding arrangements for such devices have been proposed in the past. For example, the mounting bracket can be welded to the container before the container is painted. Alternatively, a grounding clip can be applied to an edge of the capacitor (see Robinson U.S. Pat. No. 3,627,900) wherein a barb penetrates the paint and makes electrical connection to the metal container itself, and a wire extending from the grounding clip to the chassis on which the container is mounted, provides the desired electrical connection. In both of these cases, if a fault should develop between the capacitor winding and the metal container, the grounding connection between the container and the chassis is of such low resistance that the container is not permitted to rise to any dangerous voltage. Both of the foregoing arrangements involve significant expense; and in the case of the grounding clip, the barb that penetrates the paint exposes a local area of the metal container to the possibility of corrosion which, if carried to extreme, could develop an opening in the container wall and electrical failure could ensue.

SUMMARY OF THE INVENTION

An electrical device having a metal container is here provided with a coating that protects the container against corrosion. When the device is mounted on a metal chassis, especially with a metal bracket, there is a connection of moderately low resistance from the container to the grounded chassis through the coating. In itself this connection would not meet usual requirements for electrical grounding. However, in case an electrical fault should develop tending to raise the potential of the container (more than about 10 volts above ground for example) then the coating breaks down locally and a short circuit forms between the container and the metal chassis or the mounting bracket or both. The short circuit is capable of carrying relatively heavy values of current (of the order of 120 amperes) without permitting the voltage of the container to rise to a dangerous value. The chassis on which the capacitor is mounted may be covered by conventional paint which may have a very high value of resistance and in that case the bracket and bracket-mounting screws, rivets or the like provide the electrical connection from the container to the chassis via the brackets. The bracket itself is ordinarily of a bare metal, with a corrosion-resistant metal coating such as zinc or tin; or the mounting bracket itself could be covered by the same coating that is used to protect the metal container against corrosive conditions. The coating includes conductive carbon particles as of synthetic graphite, natural graphite, or conductive carbon black, and a binder that provides corrosion resistance. When it is applied, the coating includes a suitable solvent and it may also include a small percentage of pigment such as carbon black for coloring and a suitable stabilizer for the binder.

So long as the coating is intact it provides a corrosion-resistant covering for the metal container. In the event of an electrical fault developing between the container and the capacitor winding or other electrical element within the container, such as might cause the potential of the container to rise to a dangerous level, a break-down occurs from the container through the protective coating to a grounded metal part in contact with the protective coating, establishing a local short-circuit current path from the container to ground. A particular class of binders which are here called "heat degradable" melt or decompose at less than 750° F. Such binders are usually thermoplastic resins. Coatings 1.0 to 2.5 mils thick can be made using such binders, which break down when subjected to less than 10 volts.

Figure 2:
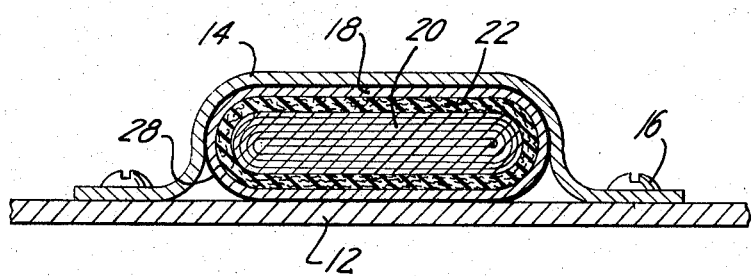

The purpose of the invention and its various novel aspects and advantages as outlined above are elaborated in the detailed description of the illustrative embodiment of the invention, which is shown in the accompanying drawings. In the drawings:

FIG. 1 is a perspective view of a capacitor and its mounting bracket, secured to a fragment of a mounting chassis; and FIG. 2 is a somewhat diagrammatic cross section of the apparatus of FIG. 1 as viewed at the plane 2—2 in FIG. 1.

As indicated above, the invention is especially applicable to electrical capacitors. As seen in FIG. 1, a capacitor 10 is secured to a metal chassis 12 by means of a metal bracket 14. Screws 16 secure the brackets to the chassis and provide a low-resistance electrical connection from the bracket to the chassis.

Capacitor 10 includes a metal container 18 which encloses a wound capacitor section 20 insulated from the container by suitable insulation 22, ordinarily one or more layers of heavy paper. The capacitor winding 20 includes two strips of metal foil which constitute the electrodes separated from each other by strips of insulation, the whole being convolutely wound and then flattened. These materials are purely illustrative. Thus, it is not uncommon for the metal foil to be replaced by vacuum-deposited films of metal directly carried by the strips of insulation. A pair of terminals 24 extend through insulating bushings 26 in one wall of the container 18. Terminals 24 are connected to the electrodes of capacitor winding 20. The whole capacitor assembled as thus far described is impregnated with an insulating fluid to fill the void spaces in the container and especially to fill the voids within the winding itself. Quite commonly, chlorinated hydrocarbons are used for this purpose. After impregnation, the container is sealed against exposure to atmospheric conditions and especially to seal moisture out.

Especially where the container of the capacitor is made of sheet steel, it is important for the steel to be protected against corrosion by a suitable coating. In conventional practice, the corrosion-resistant coating is an ordinary paint. If such paint were used for both container 18 and chassis 12, then the typical resistance between the metal of the container and the metal of the chassis would be of the order of 10,000 megohms. Terminals 24 of the capacitor may be connected to high voltage; and in that case, if there were an insulation break-down between the electrodes of capacitor section 20 and the container 18, then there is danger of the container 18 rising to a dangerous voltage. If that situation developed, and if a person were to touch container 10 at a place where the insulation might be thin or where it is chipped, he might experience a lethal shock. For this reason various arrangements have been proposed heretofore for providing a metallic conductive path from the container 18 to chassis 12, commonly involving a localized break through the paint that should continuously cover the container. There is danger of progressive corrosion developing at that break. Moreover, in practical arrangements for providing a grounding connection for the container, the various physical structures heretofore proposed have involved significant expense, both in providing the grounding connection to the container and in completing the electrical circuit from the container to the chassis.

Pursuant to the present invention, an electrically conductive coating 28 covers metal container 18 and provides corrosion resistance. This coating is continuous so as to avoid a localized breach where the bare metal of the container might be exposed to corrosion. Coating 28 that covers the metal container 18 is a form of so-called conductive paint. Bracket 14 may be tin or zinc plated steel or terne-coated steel, not painted; or the bracket may be coated with the corrosion-resistant conductive paint. In the event of a leakage current path developing between winding 20 and container 18, then there is a danger of the potential at the surface of the container rising; but leakage current of very low levels are safely carried to the grounded chassis via bracket 14. If a more severe break-down were to develop between winding 20 and metal container 18, the ordinary resistance of usual conductive paint made with graphite particles for conductivity would prove too high for preventing the exposed surface of the container from rising to a dangerously high voltage. However, the coatings of the present invention which are forms of conductive paint, break down and provide a short-circuit between the metal of container 18 and bracket 14. If chassis 12 were also of bare metal (or of metal covered with the protective coating 28) then a break-down could alternatively form between metal container 18 and metal chassis 12, a local short-circuit developing. Such a short-circuit is capable of carrying relatively high current, 180 amperes for example, without permitting the container voltage to rise to a dangerous value. Before break-down occurs (in the normal condition of a capacitor mounted as shown in the drawings) a resistance of between one-fourth ohm and 1.5 ohms between the container and the bracket is typical. These values represent the order of resistance involved, and are inexact. The coating thickness is about 1.0 mil. If 100 amperes (for example) were to flow through the resistance of 1.5 ohms in the example above, then the voltage of the container would be 150 volts. This voltage would be dangerous to humans, so that the ordinary resistance of conductive paint would not provide the desired protection. However, the present conductive paint is such that break-down occurs before the container voltage rises to a level dangerous to humans. The resistance from the container 18 to bracket 14 drops by a factor of between 10 and 100. The resistance of the coating when measured before break-down occurs is determined by measuring the current flow from a mounting bracket to the container and the bracket-to-container voltage, the measurement voltage being below break-down levels. The term "resistance" is used here rather than resistivity because in practice the bracket and the painted surface of the container have pressure contact in a localized area as a practical matter. The region at which breakdown occurs is quite small. The protective coating for resisting corrosion has been breached at that region, but is of no consequence inasmuch as the capacitor has already failed electrically due to the internal break-down of insulation, and subsequent exposure of that region of the container to corrosion is of minor concern.

The following examples of conductive paint have been found suitable for present purposes, the quantities being given in units of weight:

EXAMPLE NO. 1
| | |
|---|---|
| Carbon Black | 10.00 |
| Synthetic Graphite | 100.00 |
| 6% Iron Naphthenate | 2.00 |
| 50% Thermoplastic Acrylic Copolymer Solution In toluol* | 230.00 |
| Toluol | 904.00 |
| Methyl Butyl Ketone | 14.00 |
| Total | 1260.00 |

*Resins similar to Acryloid B82/50, B72/50, B72/50 — Rohm & Haas. Elvacite 6026/50 may be used. Material is charged into ball mill and ground for 3 to 6 hours to hegman fineness of 5. Part of the resin and thinner are held and used to wash the mill. The wash is then added to the batch. The synthetic grahite is No. 280 made by Dixon, for example.

EXAMPLE NO. 2
| | |
|---|---|
| Carbon Black | 5.00 |
| Natural Graphite | 50.00 |
| 40% Phthalic Anhydride Short Oil Alkyd* (Linseed, Soya, Tall Oil Types) | 175.00 |
| Toluol | 157.00 |
| 6% Iron Naphthenate | 1.00 |
| Total | 387.00 |

*Resins similar to Aroplaz 2462, Rezyl 387-5, Mirasol 90, Plaskon 3129 may be used. Mill treatment same as in Example No. 1. In Examples No. 1 and No. 2, the carbon black is Raven Black made by Cities Services for example. The natural graphite is No. 8485 made by Dixon, for example.

EXAMPLE NO. 3
| | |
|---|---|
| Conductive Carbon Black | 20.00 |
| V M C C Powder | 33.00 |
| V Y H D Powder | 67.00 |
| Methyl Isobutyl Ketone | 144.00 |
| Methyl Ethyl Ketone | 96.00 |
| Toluol | 239.00 |
| Propylene Oxide | 1.00 |
| Total | 600.00 |

Charge pigment, VYHD and part of solvent into pebble mill for 4 to 6 hours; grind to hegman 5. Dissolve remainder of vinyl in solvent at about 25 percent solids. Use this plus unused solvent to wash mill out. Add to paste and finish off.

VYHD is a copolymer of 86 percent vinyl chloride and 14 percent vinyl acetate and VMCC is a copolymer of 83 percent vinyl chloride and 16 percent vinyl acetate copolymer containing 0.7 percent to 0.8 percent maleic acid, both available from Union Carbide. Similar resins from B.F. Goodrich, Firestone, etc. may be used. Conductex carbon black by Cities Service may be used.

In Examples No. 1 and No. 2, the carbon black is included largely for coloring. The ketones and the toluol constitute the solvent. Polypropylene oxide is a stabilizer for the vinyl resins. In Examples No. 1 and No. 2, the iron naphthenate is a wetting agent.

Example No. 3 is presently preferred. Used as described above, it forms part of a grounding system approved by Underwriters Laboratories. It is apparent that various resins may be used in the given formula as substitutes for the resins mentioned, such as Parlon of Hercules Inc. or Alloprene of Imperial Chemical Industries.

In the above examples, toluol has been used as the solvent, together with ketones in Example No. 3. However, other hydrocarbons, esters, ketones, and alcohols either separately or used in combinations may be substituted for the given solvents, within the skill of the art.

The coating is applied, for example, by a pneumatic manually operated spray gun followed by an automatic electrostatic paint spray operation ("Ransberg") and then dried under heat lamps. Conceivably the coating could be applied as dry particles, heat-fused to some articles; but the fusion temperature would ordinarily damage capacitors.

The heat-degradable quality of the resin in each of the above examples is a distinctive attribute of the preferred coatings. In this respect, many silicone resins which fuse at temperatures well above 750° F, can be used in corrosion-resistant conductive paint and can be prepared so as to have a protective break-down characteristic. However, the thermoplastic resins in the examples above fuse or decompose at about 400° F and promote break-down when the applied voltage is low e.g., 1–10 volts for coatings 1.0 to 2.5 mils thick. Such low break-down voltage has won the approval of Underwriters Laboratories for the present type of ground-bonding system. The widely used Aquadag type of so-called conductive coating is unsuited to the purposes of the present invention inasmuch as its corrosion-resistance is poor.

Capacitors mounted as shown in the drawings are useful in outdoor-mounted air conditioners, for example. The electrical bonding system in that application might be exposed to various environmental conditions: (1) high humidity at an elevated temperature, (2) salt-spray, (3) a mixture of moist carbon-dioxide, sulfur dioxide and air, (4) ultraviolet light and water, (5) outdoor exposure, (6) air-oven exposure and (7) heat-cold cycling. Tests devised and performed by Underwriters Laboratories demonstrated the excellence of the electrical bond provided by the present heat-degradable corrosion-resistant paint. An outline of the test results follows.

A limited short-circuit test was performed on assemblies of brackets and terne-plated steel containers, coated with the composition of Example No. 3, after drying but without environmental exposure. Two connections were made to each test sample, including one connection to a bared area of the metal container and another connection to a galvanized steel strap three-fourths inch wide, with the clamp tightened against the coated container. A 240-volt alternating current source having a capability of delivering 5,000 amperes, was connected in series with a 90 ampere fuse and the bracket-container connections. The fuse blew in each such test and there was a small area showing failure of the coating, representing a localized short-circuit. This shows that even in the case of a short-circuit from the container to the electrical device in the container, the resistance of the ground bonding system was low enough to induce break-down, and after breakdown the conductive path has such high conductivity that even a large-current fuse became operative to clear the faulted circuit.

In another series of tests, an overload current of 180 amperes from a 240-volt source was passed for two minutes by the bracket-container combination described above, with a group of fresh samples and with other samples after prolonged exposure to environmental conditions (1), (2), (3) and (5), respectively, as above. In every instance the bracket-to-container electrical connection remained secure and there was no damage to the container. Conditions 4, 6 and 7 were not included in those tests.

Breakdown tests were conducted with three-fourths inch wide galvanized steel brackets and 1½ inch wide brackets, clamped to a terne-coated container with the described coating of Example No. 3. In every test of clamped containers prior to environmental exposure, the break-down occurred at 7 volts AC or less, the coating residue becoming highly conductive. After break-down, the typical volt-drop was 50 millivolts in a 30 ampere 60Hz circuit. This compares to about 25 millivolts for zinc-plated containers. Like break-down tests were conducted on many test samples after prolonged exposure of clamped containers to the above environmental conditions. One group of test samples was exposed for various lengths of time to one of the above environments and other groups were exposed to other conditions, respectively. Break-down occurred at 5 volts or less. After break-down occurred, the drop was about 400 millivolts in some instances, but averaged much less, with a measurement current of 30 amperes.

Comparative tests with zinc-coated containers generally showed much lower values of voltage-drop; but two out of three zinc test samples developed open-circuits after the prolonged exposure to salt spray.

Separate tests (not Underwriters Laboratories' tests) show that the change in resistance that occurs, before-to-after breakdown, typically is of the order of 10-to-1 and often is higher, where corrosion-resistant coatings including the examples given above, are used to cover and protect metal capacitor containers, held by a metal bracket of galvanized steel or other bare metal bracket.

Emphasis above on the bracket as having an exposed metal surface against the coated container might be misleading. If the grounded support to which the container is clamped by a bracket were bare metal or metal covered by the above described conductive coatings, then break-down could occur between that support and the container; and in that case the bracket could have an insulating coating or it could be wholly of insulation. However, the usual chassis to which the capacitor is secure has a coat of corrosion-resistant paint which cannot be expected to provide a ground connection in case of a break-down to the capacitor container from the capacitor section within the container. Hence the bracket has a conductive surface to which the break-down is formed, for insuring a grounding current path.

The term "corrosion-resistant" is used above in its usual sense, to signify affording protection against prolonged exposure to moisture and contaminated atmospheric conditions that would otherwise corrode the container, especially a sheet-steel container. Perhaps the most severe is the salt-spray test involving exposure to a fog produced in a tower constructed in accordance with ASTM Designation B117-64, supplied with humidified air at a pressure of 17–19 psig so that the salt solution, consisting of 20 percent sodium chloride by weight in distilled water, is aspirated as a fine mist into a chamber containing test specimens. The exposure time in the tests reported above extended to 1,300 hours.

Most of the so-called conductive paints are unsuited to present purposes because they are utterly inadequate as a corrosion resistant coating. Preferably for corrosion resistance the binder is an organic water-insoluble polymer resin in the formulation. The most suitable materials for present purposes are those having a relatively low melting point or decomposition point, 400° F being typical of the resins in the examples above. Resins having fusion or decomposition temperatures below 750° F are here called "heat-degradable" resins. Heat-degradable resins can generally be used with conductive carbon such as graphite or conductive carbon black to provide conductive coatings that break down when exposed to less than 10 volts under the above described test conditions.

The coating may be visualized as a thickness of many conductive carbon or graphite particles locked in a solid binder. It may be considered that a sufficient number of the particles have limited-area contact with one another so that current paths are formed extending through the coating. When a coated capacitor is clamped to a chassis, one or more extremely small areas of pressure engagement develop due to minor surface irregularities of the parts. It is here that grounding current tends to flow when an electrical fault develops in the container.

Each of the samples in the tests above had a coating, when dry, of approximately one mil (0.001 inch) thick. Break-down is believed to occur as a result of local current-flow developing heat that softens the resin and allows the resin to flow and allows the particles to pack tighter together, thereby to improve the conduction path from the container to the bracket. Ensuing high localized current accelerates the process and a short-circuit develops suddenly. The corrosion-resistant coating is breached locally under these conditions, but since the device has already failed electrically there is no consequence to that breach in the coating.

In view of the latitude of modifications and varied applications of the novel features in the foregoing that may be made by those skilled in the art, the invention should be construed broadly in accordance with its full spirit and scope.

We claim:
1. Electrical apparatus including:
   A. an electrical device having
      i. An external metal structure,
      ii. An electrical component carried by said external metal structure and adapted to be energized at a voltage dangerous to humans,
      iii. Electrical insulation separating the external metal structure from the electrical component, and
      iv. A corrosion-resistant coating of low electrical resistance covering the exposed area of said external metal structure; and
   B. Electrical grounding and mechanical mounting means for said electrical device, including
      i. A support, normally grounded when in use, and
      ii. A mounting bracket securing said electrical device to said support,
      iii. A portion of said electrical grounding means being conductive and engaging said coating,
         said low-resistance coating having an electrical break-down characteristic promoting the formation of a short circuit between said conductive portion of said electrical grounding means and said external metal structure upon occurrence of a fault in said electrical insulation that raises the potential of said external metal structure above ground by a low voltage not dangerous to humans.

2. Electrical apparatus in accordance with claim 1, wherein said electrical device is a capacitor and said external structure is a metal container forming part of the capacitor and said electrical component is a capacitor electrode assembly.

3. Electrical apparatus in accordance with claim 1, wherein said coating includes particles of an electrically conductive form of carbon and a heat-degradable resin.

4. Electrical apparatus in accordance with claim 2, wherein the composition of said coating includes particles of the group consisting of natural graphite, synthetic graphite and conductive carbon black for imparting electrical conductivity and a heat-degradable resin for imparting corrosion resistance and an electrical break-down characteristic at a voltage up to 10 volts for a coating about 1 mil thick.

5. An electrical device having
   i. An external metal structure,
   ii. An electrical component carried by said external metal structure and adapted to be energized at a voltage dangerous to humans,
   iii. Electrical insulation separating the external metal structure from the electrical component, and
   iv. A corrosion-resistant coating of low electrical resistance covering the exposed area of said external metal structure, said low-resistance coating having an electrical break-down characteristic promoting the formation of a short-circuit between the said external metal structure and a grounding and mounting structure for said electrical device when, due to the occurrence of a fault in said insulation, the potential of the external metal container structure rises above ground by a low voltage not dangerous to humans.

6. An electrical device in accordance with claim 5, wherein said coating includes particles of an electrically conductive form of carbon and a heat-degradable resin.

7. An electrical device in accordance with claim 5, wherein said electrical device is a capacitor and said external structure is a metal container forming part of the capacitor and said electrical component is a capacitor electrode assembly.

8. An electrical device in accordance with claim 7, wherein the composition of said coating includes particles of the group consisting of natural graphite, synthetic graphite and conductive carbon black for imparting electrical conductivity and a heat-degradable resin for imparting corrosion-resistance and an electrical break-down characteristic at a voltage up to 10 volts for a coating approximately 1 mil thick.

* * * * *